April 3, 1951  G. F. DALY ET AL  2,547,445
RECORD PERFORATING MACHINE
Filed Aug. 13, 1947  5 Sheets-Sheet 4
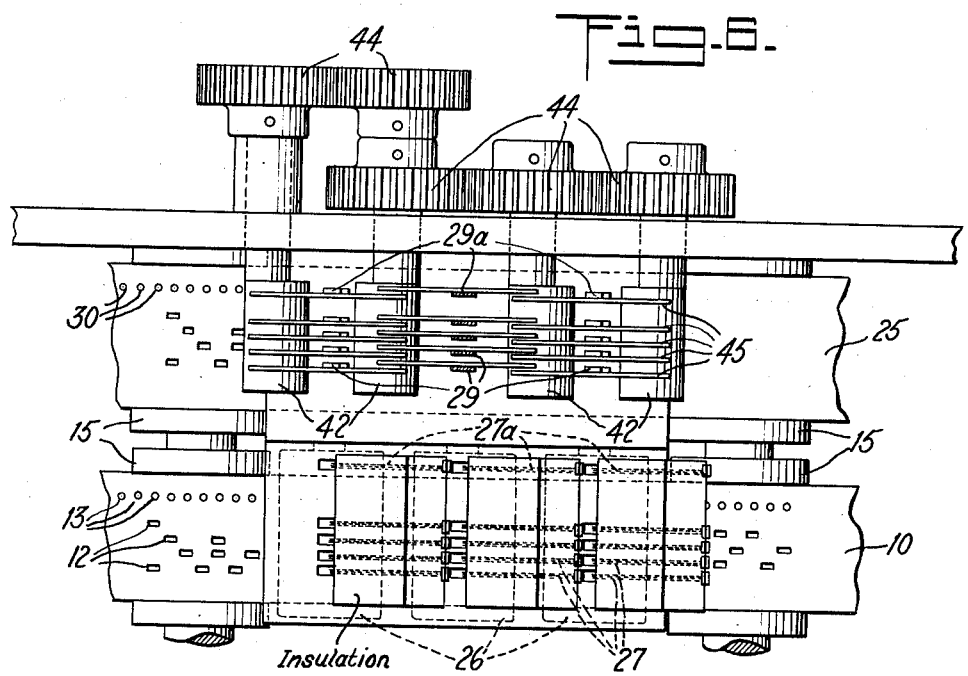
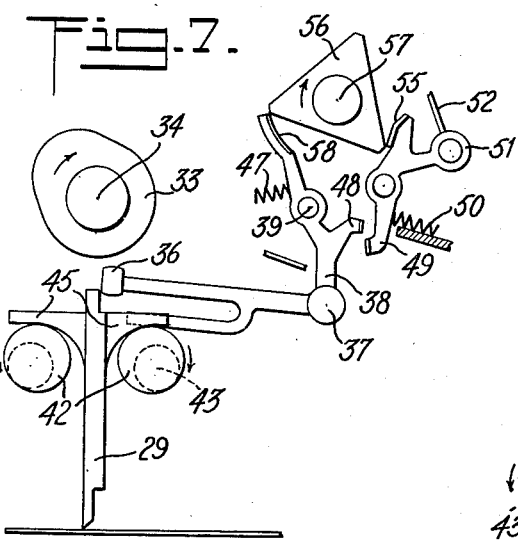
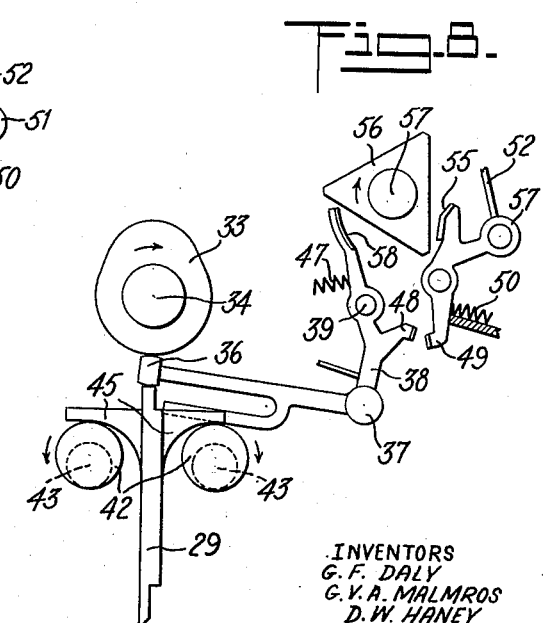
INVENTORS
G. F. DALY
G. V. A. MALMROS
D. W. HANEY
BY
William Lang
ATTORNEY

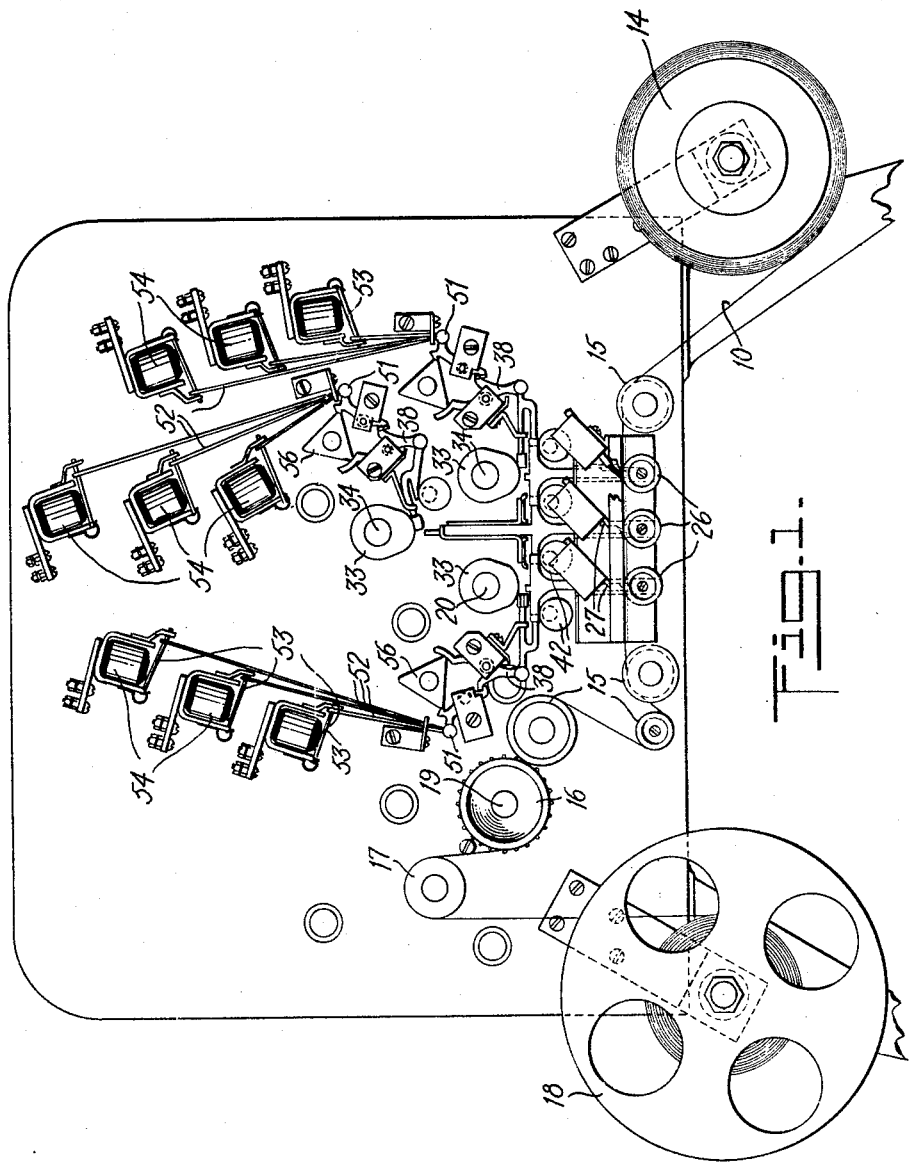

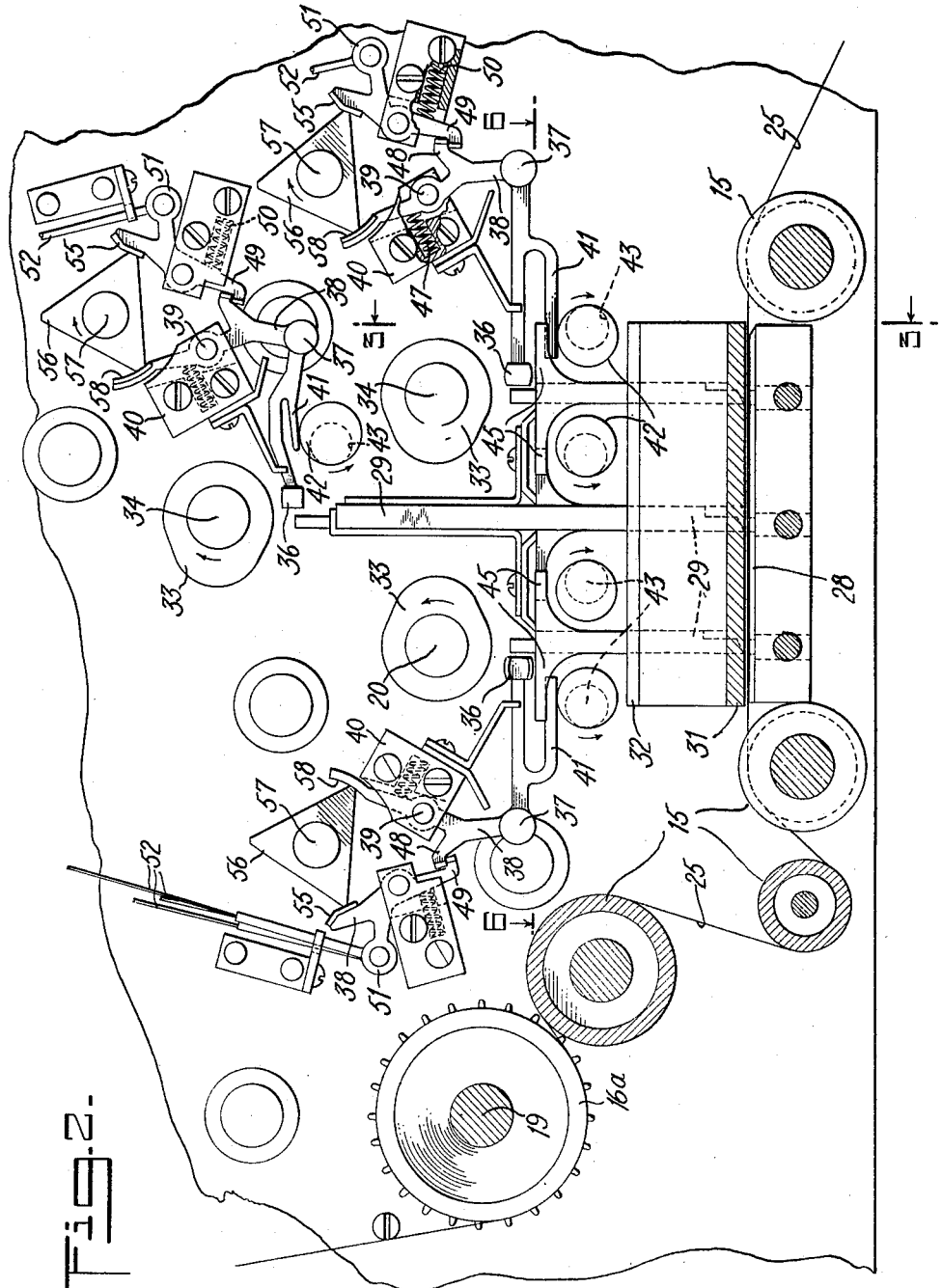

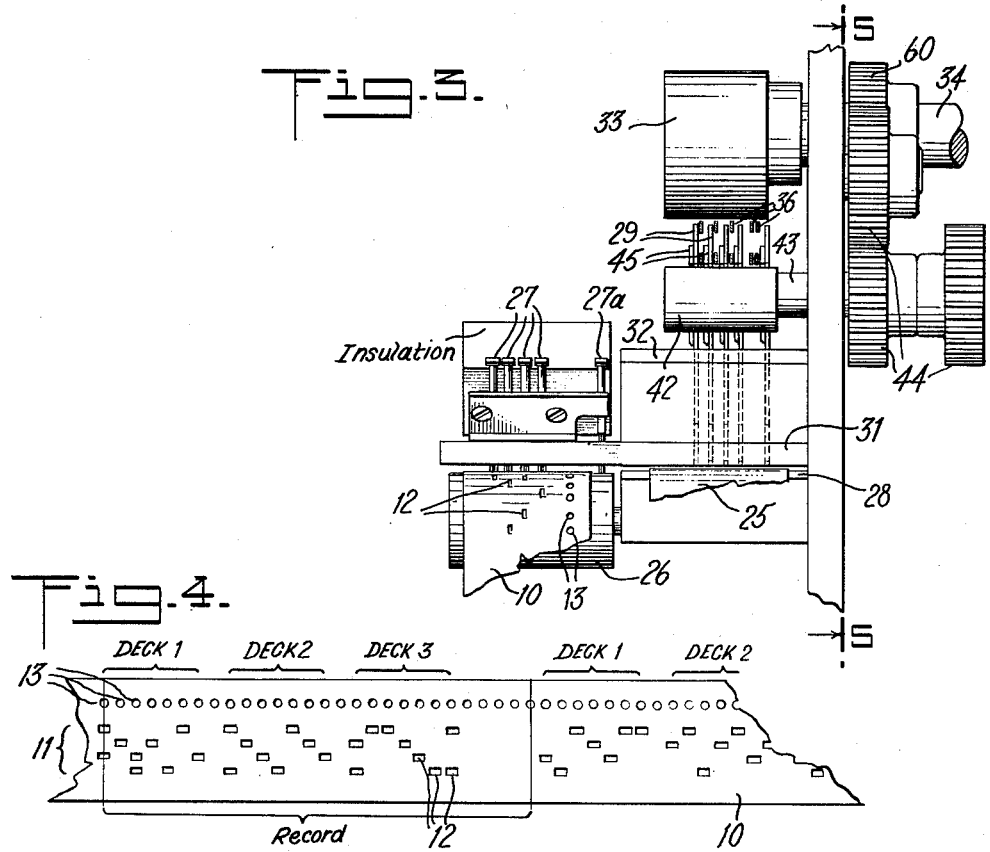
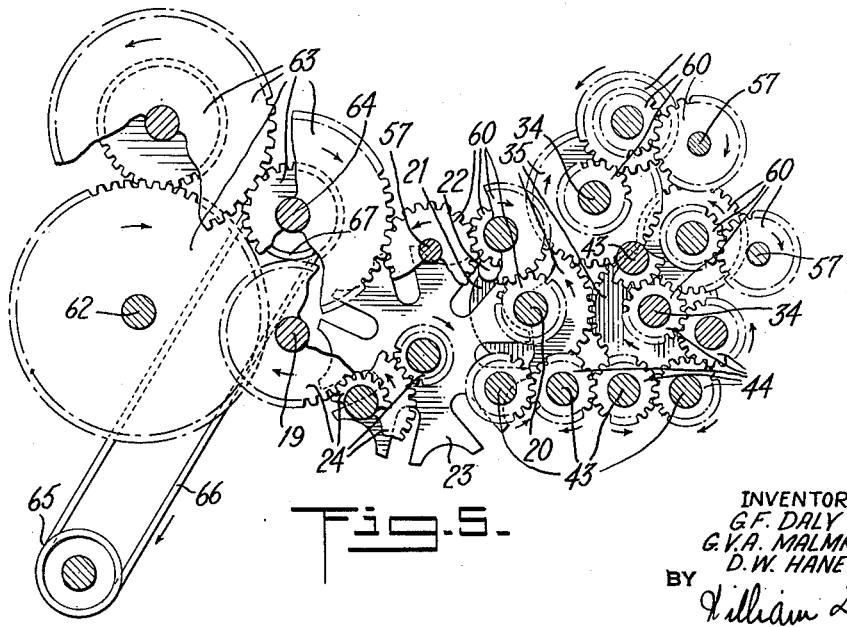

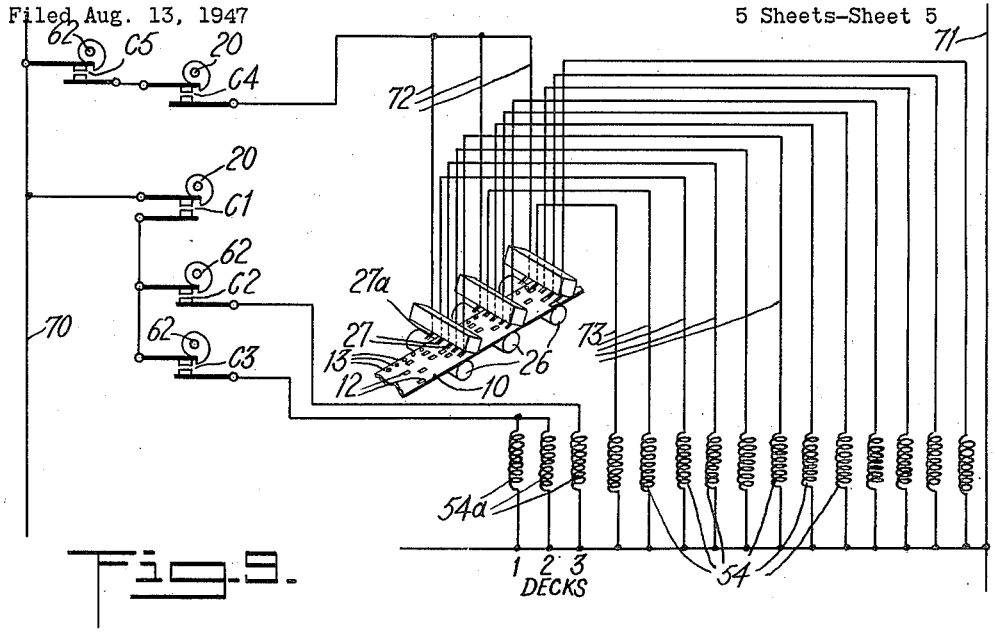
Fig. 9.
Fig. 10.
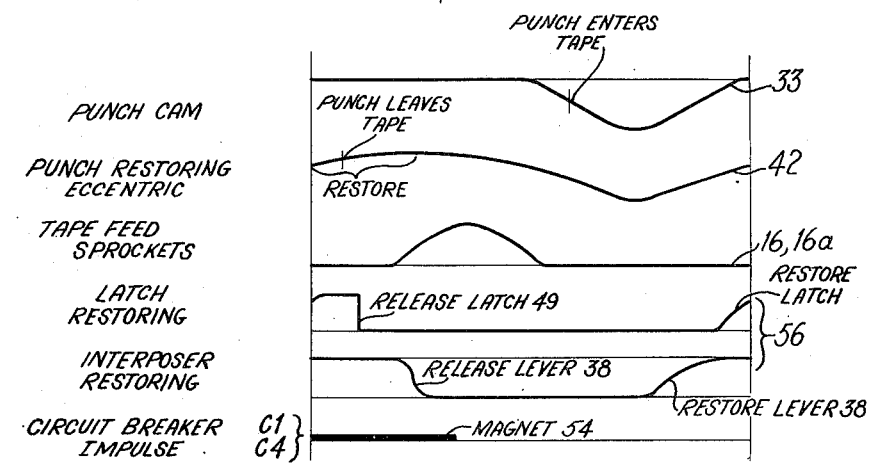
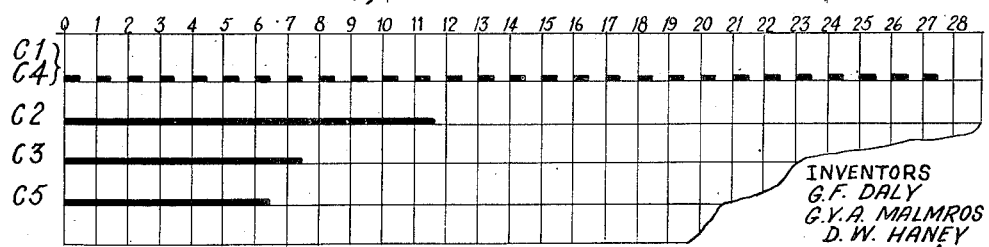
Fig. 11.
INVENTORS
G. F. DALY
G. Y. A. MALMROS
D. W. HANEY
BY William Lang
ATTORNEY

Patented Apr. 3, 1951

2,547,445

UNITED STATES PATENT OFFICE

2,547,445

RECORD PERFORATING MACHINE

George F. Daly, Endicott, Gustav V. A. Malmros, Binghamton, and Donald W. Haney, Vestal, N. Y., assignors to International Business Machines Corporation, New York, N. Y., a corporation of New York Application August 13, 1947, Serial No. 768,380

6 Claims. (Cl. 164—115)

This invention relates to perforating machines and more particularly to a machine for perforating a record under control of a second prepunched record.

The principal object of the invention is to provide an improved perforating mechanism in which the control and actuating instrumentalities are designed to provide a rotary movement to the end that higher speeds and quieter operation are obtainable.

A further object of the invention is to provide a novel punch selecting and actuating mechanism in which rotary cam devices are timed and coordinated to effect positive and direct actuation of selected punches at a rapid rate.

A still further object of the invention is to provide a punch interposer selecting and controlling device, wherein a magnetically actuated latch releases an interposer for operation and a timing device is provided to hold the latch against release until the flux density is at a peak in the operating magnet, which releases a latch by a timing device.

Another object of the invention is to provide a record sensing and punching mechanism wherein columns of a record are sensed one at a time to control punching of like data in another record, and in which improved controls are provided whereby sensing of one column is effected before the completion of punching of a previous column.

A more specific object is to provide a record sensing and punching machine in which operations of sensing, punch selection and punch operation occur in succession for each column of a record sensed, and in which sensing and punch selection of one column occurs during the punch operation for a prior column.

Other objects of the invention will be pointed out in the following descripiton and claims and illustrated in the accompanying drawings, which disclose, by way of example, the principle of the invention and the best mode, which has been contemplated, of applying that principle.

In the drawings:

Fig. 1 is a front elevation of the apparatus showing the general location of the component parts and the supply and rewind record tape reels.

Fig. 2 is an enlarged elevation looking in the same direction as Fig. 1 with the sensing brushes omitted to show the punches.

Fig. 3 is a sectional view taken along lines 3—3 of Fig. 2, showing the relative location of the tapes and their related sensing and punching devices.

Fig. 4 is a fragment of a record tape to be sensed and reproduced.

Fig. 5 is a detail showing the drive gearing, the view looking in the same direction as Fig. 1.

Fig. 6 is a sectional view taken substantially along lines 6—6 of Fig. 2.

Figs. 7 and 8 are position views of the punch selecting and actuating mechanism constituting parts in Fig. 2 in moved position.

Fig. 9 is a wiring diagram of the electric circuits of the apparatus.

Fig. 10 is a timing chart of the actuating devices for one step of operation.

Fig. 11 is an electrical time chart for a cycle of operation, constituting twenty-eight successive steps.

Referring to Fig. 4, 10 represents the record tape to be reproduced, along which are arranged four horizontal rows 11 of perforating positions, in which rectangular holes 12 are made to represent data, by single or multiple holes in vertical columns. In line with each vertical column is a circular feed hole 13 which, as will be explained, is engageable in a suitable sprocket wheel to advance the tape 10. Twenty-eight columns constitute a record as indicated in Fig. 4, and, within each record, groups of seven columns constitute three decks separated by a blank column from one another and separated from the deck in the adjacent record by five blank columns.

In the operation of the machine the holes 12 are to be sensed to control the punching of a second blank record and thereby effect a reproduction of the tape 10 of Fig. 4. Sensing is effected by concurrently reading the first or left hand columns in the three decks of a record and then in succession reading the second sets of columns, and so on until all seven columns have been read and reproduced. Thus, in seven steps of readings the twenty-one perforated columns will have been reproduced and thereafter sensing is suspended until the first columns of the decks in the following record arrive in sensing position, when the operations are repeated.

In Fig. 1, tape 10 is led from a supply spool 14 over and around guide rollers generally designated 15 (see also Fig. 6) to a sprocket wheel 16 secured on a shaft 19 and thence around roller 17 to a rewind spool 18. Sprocket wheel 16 is advanced intermittently through a Geneva mechanism shown in Fig. 5. In this figure, 20 represents the main drive shaft of the apparatus driven from any suitable source and has secured thereto a disk 21 provided with a pin 22 engageable in the radial slots of a Geneva wheel 23, so that as disk 21 turns wheel 23 is intermittently advanced and through gearing generally designated 24 drives the sprocket wheel shaft 19 so as to advance the tape 10 one step or column for each revolution of the main shaft 20.

Directly behind tape 10 and guided from a similar supply reel to a similar rewind reel over rollers 15 is a tape 25 (see Figs. 2, 3 and 6). This tape is fed by a sprocket wheel designated 16a (Fig. 2) also secured on shaft 19, so that tape 25 is advanced in unison with tape 10.

In starting operations, tape 10 is threaded around the rollers 15 and wheel 16 and tape 25 is similarly inserted. For starting purposes, the tape 25 is provided with feed holes similar to holes 13 in tape 10 extending from wheel 16a to a point intermediate the two right hand rollers 15. Further feed holes will be automatically made as the duplicating proceeds and as will be explained hereinafter.

As tape 10 is advanced step by step, it traverses three contact rollers 26 insulated from the machine and three coacting sets of sensing or reading brushes 27 spaced apart a distance equal to eight record columns so that, when any column in one deck is at the left hand set of brushes 27, the corresponding columns in the other two decks are at the next two sets of brushes. Each set comprises four brushes 27 (see Figs. 3 and 6) traversing the perforation rows 11 and a common brush 27a for conducting current to the roller 26.

Referring now to Fig. 2, tape 25 passes between die plate 28 and three sets of punches 29 aligned with the three sets of brushes 27. There is a punch 29 for each brush 27 and in line with each set of punches there is an additional punch 29a whose perforating extremity has a circular cross-section for punching the feed holes 30 in tape 25 (Fig. 6).

Punches 29, 29a are mounted as shown in Fig. 2 between lower guide 31 and upper guide 32 with a slight frictional bias to hold the punches in position against gravitational action. A wide cam 33 (Fig. 3) extends across the top of each set of punches, one of said cams being secured to main drive shaft 20 while the other two are carried on shafts 34 driven from shaft 20 through gears designated 35 (Fig. 5), so that the cams rotate in the directions indicated by arrows in Fig. 2 making one revolution for each step of feed of the tapes 10 and 25.

For each punch 29, 29a there is an interposer 36 pivoted at 37 to a lever 38 which in turn is pivoted at 39 to a fixed block 40. Interposer 36 is bifurcated to provide a finger 41 which rests upon a cam 42. Five cams 42 are provided with supporting shafts 43 geared together and driven from the lower shaft 34 (Fig. 5) through gears generally designated 44, so that cams 42 make one revolution for each revolution of main shaft 20. Thus, as cams 42 rotate the free ends of the interposers 36 are oscillated in a vertical direction. The cams 42 are coextensive with cams 33 and lie beneath arms 45 extending laterally from both sides of punches 29, 29a with the arms arranged on alternate sides of the punches for compactness of arrangement as shown in Fig. 6.

Any punch which has been depressed will be restored upwardly by the pair of adjacent cams 42 which by their balanced disposition effect a torsionless lifting action, so that the punches are elevated by the cam action to the positions shown in Fig. 2.

The manner in which the interposer 36 is positioned between the head of punch 29 and actuating cam 33 is as follows. Supporting lever 38 (Fig. 2) is normally urged by a spring 47 about its pivot 39 but is constrained against rotating by engagement of an extension 48 thereon, with a latch 49 which is also urged into latching position as shown by a spring 50.

Latch 49 has connected thereto at 51 a call rod 52 whose other end (see Fig. 1) connects with the armature 53 of a magnet 54. There is a magnet 54 and connections 52, 51 etc. for each of the punches, and the magnets are staggered in the usual manner to accommodate the closer spacing of the punches.

Upon energization of magnet 54 rod 52 is tensioned to rock latch 49, but rotation is prevented by engagement of a face 55 of the latch against a high point of a triangular cam 56 secured to shaft 57, so that the operation of the latch is delayed until the cam has turned sufficiently to release the latch as shown in Fig. 7.

While the face 55 is engaged by a high point of cam 56, another high point engages and holds a face 58 of lever 38 to thereby release the pressure of the extension 48 upon latch 49 whereby, when the latch is released as in Fig. 7, it may readily rock under the influence of magnet 54 which has only the force of spring 50 to overcome.

Lever 38 thus freed for rotation is, nevertheless, still prevented from rocking by the high portion of cam 56 as shown in Fig. 7 and rocking takes place upon continued rotation of the cam 56 to the position of Fig. 8, where spring 47 will rock lever 38 and shift interposer 36 to bring its free end into vertical alignment with punch 29. At this time the interposer 36 is held in its upper position by cam 42 and cam 33 has its lower concentric portion facing the interposer, so that an opening is provided into which the interposer head will extend as shown in Fig. 8.

The shafts 57 carrying cams 56 are driven from shafts 34 or 50 with a 1 to 3 ratio through compound gearing generally designated 60 in Fig. 5, so that for each revolution of cams 33 the cams 56 make a third of a revolution.

Referring to Fig. 8, as cam 33 continues to turn it will force the head of interposer 36 down against punch 29 and force the latter through tape 25. Cams 42 rotating in synchronism with cam 33 release the punch for downward movement and thereafter act upon arms 45 to retract the punch. During this retraction cam 56 acts to restore lever 38 and latch 49.

In Fig. 10 is shown the timing of the several cams for one revolution of cams 33 or one step of the tapes. At the bottom of the figure is shown the period of energization of magnet 54 under control of contacts C4. Analysis of the chart shows that, while magnet 54 is energized, cam 56 first releases latch 49 at the point indicated and shortly thereafter cam 56 also releases lever 38 to enable interposer 36 to shift into interposing position. It is to be particularly noted that at such time cam 42 is restoring punch 29 from a prior punch operation and such punch is not yet fully restored.

It is also to be noted that sprockets 16, 16a advance the tapes and that such advance occurs before the actuating cam 33 depresses the selected punch. In other words, a punch is selected for operation by energization of magnet 54 and tripping of latch 49 and lever 38 during the period when a previously operated punch is being restored and the tapes advanced. By means of this overlap in operation, higher operating speeds are obtainable since the card sensing and punch selecting do not require extra time for their performance.

In the circuit diagram (Fig. 9), contacts designated C1 and C4 are controlled by cams secured to shaft 20 which makes one revolution for each step of advance of the tapes or each turn of cams 33. For a complete record sensing and punching operation requiring twenty-eight cycles, these contacts C1 and C4 will accordingly close twenty-eight times as indicated in Fig. 11. In the circuit diagram are shown also contact cams C2, C3 and C5 controlled by cams carried by a shaft 62 geared to make one revolution for every twenty-eight revolutions of shaft 20. The drive for the shaft 62 is shown in Fig. 5 where shaft 20 is shown as driving the same through gearing generally designated 63 and four of the gears 60 with a 28 to 1 ratio. The shaft 64 carrying one of the gears 63 is provided with a pulley 67 which through a belt 66 drives a pulley 65 secured to the shaft of rewind spool 18.

Considering the start of a sequence of cycles with brushes 27 positioned at the first column of perforations in the three decks (see Fig. 4), with current supplied to main lines 70 and 71 (Fig. 9) circuits will be completed from line 70, contacts C5 and C4, through wires 72 to the three common brushes 27a, rollers 26 and thence through perforation 12 in tape 10 to brushes 27 and wires 73 to magnets 54 and line 71. When contacts C4 open, the circuit will be broken but in the meantime the selected interposers will have been released, so that when the tapes have been spaced and cam 42 reaches its full restoring position the interposers will shift beneath cam 33 for actuation thereby. It is to be noted that sensing occurs when a record column is at the sensing brushes and punching in response to perforations in such column occurs when the next column is at the sensing brushes. In other words, punching of one column occurs while the next column is being sensed.

The circuits traced are repeated through paths determined by the position in which holes 12 occur for each of several cycles, when contacts C5 open to render further closures of contacts C4 ineffective for the remainder of the 28-cycle sequence.

In Fig. 9 the three magnets designated 54a select the interposers 36 related to the feed hole punches, and these are energized through circuits as follows. Contacts C3 close for eight steps or cycles (see Fig. 11), so that eight impulses from contacts C1 energize magnets 54a related to decks 1 and 2 and will be energized to effect feed hole punching in the first sixteen positions of tape 25. Contacts C2 close for twelve steps, so that twelve C1 impulses are sent to magnet 54a related to deck 3. There are thus provided twenty-eight feed hole impulses to punch the twenty-eight holes 30 in tape 25 for one record. When the last such hole is punched, all circuits are in disabled condition but the feed continues for sixteen additional cycles to bring the first columns of the next record into sensing position and from this point on the operations repeat as set forth.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record punching machine, a punch element mounted for reciprocation, a rotary actuating cam, an interposer shiftable into position between the cam and punch element, a latch normally restraining the interposer, operating means therefor, and a rotary timing cam operable upon release of the interposer by the latch for controlling the movement of the interposer into operating position.

2. In a record punching machine, a punch element mounted for reciprocation, a rotary actuating cam, an interposer shiftable into position between the cam and punch element, a latch normally restraining the interposer, means for urging the latch to release the interposer, a rotary timing cam normally holding both the interposer and latch against operation, said timing cam being configured to effect during its rotation release of the latch and then release of the interposer for operation and to thereafter restore the interposer and latch to their initial positions.

3. In a record punching machine, a punch element mounted for reciprocation, a rotary actuating cam, an interposer positionable between the punch element and the actuating cam whereby the punch element will be operated during rotation of the cam, a rotary restoring cam engageable directly with the punch element to restore the same and gear connections between said cams to drive the same in unison, the cams being so configured that they actuate and restore the punch element with a simple harmonic movement.

4. The invention set forth in claim 3, in which the actuating cam is positioned to act along the vertical axis of the punch element and a pair of restoring cams is provided positioned to act on the punch element equal distances on opposite sides of the vertical axis, whereby restoration is effected without torsion.

5. In a record punching machine having a punch element, an actuating cam therefor, and an interposer mounted for movement into position between the cam and punch element, in combination with a lever connected to said interposer, actuating means therefor, a rotary cam for controlling the movement of the lever whereby said interposer will move to active position at a predetermined point in the rotation of the cam, a latch normally holding the lever against operation, and means for causing the latch to release the lever, said rotary cam being arranged to act upon the latch and control the time of its releasing movement.

6. The invention set forth in claim 5, in which the said rotary cam is provided with multiple lobes disposed so that each lobe coacts in alternation with the latch and lever, and as any lobe coacts with the latch another lobe coacts concurrently with the lever.

GEORGE F. DALY.
GUSTAV V. A. MALMROS.
DONALD W. HANEY.

REFERENCES CITED

The following references are of record in the file of this patent:

UNITED STATES PATENTS

| Number | Name | Date |
| --- | --- | --- |
| 1,827,362 | Hiltz | Oct. 13, 1931 |
| 2,343,405 | Doty | Mar. 7, 1944 |
| 2,377,801 | Mills | June 5, 1945 |
| 2,436,126 | Tholstrup | Feb. 17, 1948 |
| 2,445,834 | Laney | July 27, 1948 |

FOREIGN PATENTS

| Number | Country | Date |
| --- | --- | --- |
| 29,389 | Great Britain | Jan. 20, 1914 |